(12) United States Patent
Zeiss et al.

(10) Patent No.: US 7,759,586 B2
(45) Date of Patent: Jul. 20, 2010

(54) WEIGHT-RECEIVING PLATFORM FOR A BALANCE AND A HOLDER THEREFOR

(75) Inventors: Siegfried Zeiss, Wolfhausen (CH); Hansjoerg Rotach, Effretikon (CH)

(73) Assignee: Mettler-Toledo AG, Greifensee (CH)

( * ) Notice: Subject to any disclaimer, the term of this patent is extended or adjusted under 35 U.S.C. 154(b) by 219 days.

(21) Appl. No.: 12/047,373

(22) Filed: Mar. 13, 2008

(65) Prior Publication Data

US 2008/0230281 A1 Sep. 25, 2008

(30) Foreign Application Priority Data

Mar. 21, 2007 (EP) .................................. 07104592

(51) Int. Cl.
*G01G 21/00* (2006.01)
(52) U.S. Cl. ........................ 177/126; 177/180; 177/253; 177/255; 177/262; 108/42; 108/51.3; 211/135; 29/557
(58) Field of Classification Search ......... 177/126–128, 177/180, 252, 255, 262; 108/42, 51.3; 211/135; 29/557, 558
See application file for complete search history.

(56) References Cited

U.S. PATENT DOCUMENTS

| 292,935 | A | * | 2/1884 | Meyer, Jr. ................... 177/244 |
| 336,275 | A | * | 2/1886 | Willson ....................... 177/229 |
| 2,900,667 | A | * | 8/1959 | Longenecker ................ 264/139 |
| 3,354,971 | A | * | 11/1967 | Vash et al. ................... 177/126 |
| 3,481,487 | A | * | 12/1969 | Paruolo ....................... 211/208 |
| 3,502,163 | A | * | 3/1970 | Stehl .......................... 177/126 |
| 3,912,291 | A | * | 10/1975 | Frisch .................... 280/33.992 |
| 4,102,276 | A | * | 7/1978 | Roveroni ..................... 108/156 |
| 4,744,428 | A | * | 5/1988 | Knotter et al. .............. 177/127 |
| 5,283,395 | A | * | 2/1994 | Pitaud ........................ 177/229 |
| 5,711,434 | A | * | 1/1998 | Adams ..................... 211/86.01 |
| 6,376,783 | B1 | * | 4/2002 | Vaghi ....................... 177/25.15 |
| 6,420,666 | B1 | | 7/2002 | Baumeler et al. |
| 6,509,534 | B1 | * | 1/2003 | Thadani ...................... 177/126 |
| 6,708,627 | B1 | * | 3/2004 | Wood ........................... 108/42 |
| 6,866,157 | B2 | * | 3/2005 | Shone ..................... 211/90.03 |
| 7,227,087 | B2 | * | 6/2007 | Luechinger ................. 177/180 |
| 7,227,088 | B2 | * | 6/2007 | Luechinger et al. ......... 177/180 |
| 2004/0200643 | A1 | * | 10/2004 | Kissick ....................... 177/126 |

(Continued)

FOREIGN PATENT DOCUMENTS

EP 0290880 A2 11/1988

(Continued)

*Primary Examiner*—Randy W Gibson
(74) *Attorney, Agent, or Firm*—Standley Law Group LLP (57) ABSTRACT

A weighing lift has a single-piece platform for an electronic balance and a holder into which the platform can be plugged. The platform has a load-receiving area for an object to be weighed, a centering pin and a rotation-blocking element. The rotation-blocking element is arranged between the load-receiving area and the centering pin. The single-piece platform is preferably made from a sheet metal material. The platform can be plugged substantially without loose play into the holder. The holder has at its end a first coupling portion with a wedge-shaped groove serving to receive the rotation-blocking element. It also has a body in which a receiving seat is formed for the centering pin, which serves to position the platform parallel to the load direction of the object.

19 Claims, 6 Drawing Sheets

U.S. PATENT DOCUMENTS

2006/0123619 A1\*  6/2006  Nilsson ........................ 29/558
2006/0137915 A1\*  6/2006  Luechinger ................. 177/180
2008/0190331 A1\*  8/2008  Dickner et al. ............. 108/51.3

FOREIGN PATENT DOCUMENTS

FR         002861696  A  \*  5/2005
JP         2006-46912 A      2/2002

\* cited by examiner

WEIGHT-RECEIVING PLATFORM FOR A BALANCE AND A HOLDER THEREFOR

CROSS-REFERENCE TO RELATED APPLICATIONS

This application claims a right of priority under 35 USC §119 from European patent application 07104592.6, filed 21 Mar. 2007, the content of which is incorporated by reference as if fully recited herein.

TECHNICAL FIELD

The invention relates to a platform made in one piece from a sheet metal material, a holder into which the platform can be set, a method for manufacturing the platform, as well as the use of at least two platforms and two holders in a weighing lift for an electronic balance.

BACKGROUND OF THE ART

In principle, a multitude of platforms for different types of balances are known whose shapes are often adapted to the respective field of application, to the weighing object and/or to the balance being used. A platform in the present context means not only a weighing platform or weighing pan that is in contact with a force-measuring system of the balance, but it also encompasses a transfer platform or support device for transporting the weighing object to and from the weighing platform. Platforms of this kind carry weighing objects during the weighing itself or during the transfer to or from the weighing platform. The cooperation between a weighing platform and a transfer platform is used for example in a weighing lift for a balance that is capable of automation.

The requirements on the design of the balance and also of the platform are increasing constantly, in particular in fields of application that are subject to stringent legal guidelines such as for example the fields of medicine, biochemistry or pharmaceuticals. These requirements include for example that the parts of the balance coming into contact with a weighing object, in particular the platform, must be easy to clean. For the cleaning, the platform is normally uninstalled from the balance, cleaned and dried separately, and then reinstalled. The objective is to not only decontaminate and clean the platform physically and/or chemically of residues, but also to sterilize it if applicable, so that it satisfies at least the legally mandated sanitary standards.

The manual or automated uninstalling and reinstalling of the platform, in particular of the weighing platform, can present problems especially in balances of very high resolution, so-called microbalances, because even an unintentional misaligning of the weighing platform in the process of uninstalling or uninstalling can cause damage to the weighing mechanism.

The desired easy cleaning of a platform thus entails the requirement that the platform be simple and problem-free to remove from and reinstall in a balance. Of course, an exchange of the platform should be possible without a loss in quality relative to the weighing result, i.e. neither the platform nor the weighing mechanism should be influenced or damaged in the process.

In JP 2006-046912 A, a saucer-shaped weighing pan is disclosed which by way of a stem attached in the direction of the load can be inserted into a holder that is in contact with the weighing cell. The stem has two resilient elements equipped with means of engagement at their free ends. For insertion into the holder, the resilient elements are pressed together. When the pressure is taken off the resilient elements, they spread apart again and push the stem into the holder. In addition, the means of engagement of the weighing pan snap into recesses in the holder so as to lock the weighing pan in place. To release the connection, the means of engagement, which protrude from the holder, are slightly squeezed together. Weighing pans of this kind can be used only if the holder is accessible in as well as against the direction of the load. This condition is not normally met in microbalances or weighing lifts of a compact design. Besides, the process of milling the weighing pan out of a block of material would be time-consuming and expensive, in particular since the resilient elements must be sturdy in order to allow the weighing pan to be exchanged regularly, and as a consequence the weight of the weighing pan can be relatively high.

Platforms of the known state of the art, particularly those that are used in balances that are capable of automation, normally consist of a plurality of parts, so that it is hardly possible to manufacture a completely gap-free platform. This has in addition to high manufacturing costs the further disadvantage that the platform needs to be dried for a very long time after a cleaning in order to ensure that all residues of cleaning liquids have been driven out of the gaps. This is necessary because in microbalances even the smallest quantities, including possible residues, are being measured and can falsify the measuring result. In addition, these platforms are relatively susceptible to wrongly directed mechanical forces and have to be handled very carefully.

Accordingly, the task presents itself to provide a platform for electronic balances, in particular for balances capable of automation, which is easy to clean and simple to exchange.

SUMMARY OF THE INVENTION

This task is solved by a platform for an electronic balance. The platform comprises a load-receiving area on which to set the weighing object, a centering pin and a rotation-blocking element which is arranged between the load-receiving area and the centering pin. The platform is further made in one piece of a sheet metal material and designed to be plugged into a holder essentially without play.

The holder has at its end a first coupling area with a wedge-shaped groove serving to receive the rotation-blocking element, and further has a body in which a seat for the centering pin for positioning the platform is formed parallel to the load direction.

The load-receiving area of the platform can receive a weighing object, so that the load direction is defined as the direction in which the weight force of the weighing object is acting. Due in particular to its single-piece configuration, the platform is very cleaning-friendly. When plugged together, the platform and the holder can be connected to each other essentially without loose play.

Due to the fact that the centering pin is aligned parallel to the load direction in the receiving seat of the holder, the platform can be aligned and centered so that even small loads can be determined with a high level of precision when the platform is in force-transmitting contact with a force-measuring system that is arranged in the balance. In addition, the platform and the holder can be separated from each other in a simple manner and in particular without jamming due to misalignment. The platform can furthermore also be exchanged for another platform. In sensitive areas it would even be conceivable that the platform is a one-way component which is exchanged for each weighing object or after a certain period of use.

The platform further has a guide element which on the one hand stabilizes the platform in a plane perpendicular to the load direction and which on the other hand, when plugging together or separating the platform and the holder, guides or directs the movements of the two components relative to each other.

The load-receiving area of the platform is connected to a stem which is oriented parallel to the load direction. This stem carries the centering pin, the rotation-blocking element as well as the guide element and represents that part of the platform which can be plugged into the holder. The stem is designed so that it serves to align, center and stabilize the platform in the holder parallel to the load direction as well as to plug together or separate these components without jamming.

The design of the stem includes the arrangement of the guide element between the rotation-blocking element and the centering pin. Preferably, the rotation-blocking element, the centering pin and the guide element are connected to each other by a stem-shaped extension.

The rotation-blocking element can be an essentially flat, for example rectangular element which can be arranged in the holder in such a way that the platform is held essentially without loose play at least in a plane that is orthogonal to the load direction. Perpendicular to the load direction, the rotation-blocking element is dimensioned larger than the centering pin and the guide element. The guide element, in turn, is dimensioned larger perpendicular to the load direction than the centering pin, with the compared dimension being oriented the same way as in the rotation-blocking element.

The centering pin can be configured with a square profile whose sides are essentially as wide as the material thickness of the sheet metal used to manufacture the platform.

The rotation-blocking element serves to protect the platform against tilting in a plane orthogonal to the load direction and to the lengthwise direction of the rotation-blocking element as well as to protect the platform against the effects of turning forces and thus against rotation.

The load-receiving area of the weighing platform can have at least two cantilevered extremities serving to support the weighing object at a plurality of points, which can be shaped for example similar to the tines of a fork or which can form a kind of spider whose at least three extremities meet the stem in an essentially point-shaped connection.

The platform can further have a load-receiving area which is designed for a distributed contact with the weighing object, as the platform forms a preferably perforated weighing tray. A platform of this type can have a stem arranged in the middle or off-centered for insertion into a holder. The perforated design of the platform serves in particular to reduce the weight, and/or it can be due to the manufacturing process.

The load-receiving area can also be adapted individually to the weighing object that is to be processed. To perform the weighing, the weighing object can be placed directly on the load-receiving area, or for very small weighing objects an auxiliary means such as a container can be used whose weight has been determined beforehand and is subsequently subtracted from the total weight that was determined.

Platforms for electronic balances can be made of different sheet metal materials. Particularly suitable are stainless steels, noble metals, aluminum or titanium as well combinations of the two. The platform can be manufactured in principle of any metals which can be made into sheet metal stock. It would further be conceivable to coat the platforms in a further processing step.

A further aspect of the invention concerns a holder which works together with the platform and into which the platform, which includes a load-receiving area for a weighing object and a rotation-blocking element, can be plugged with essentially no loose play. The holder comprises a first coupling portion at its end, in which a wedge-shaped groove is formed to position the platform parallel to the load direction, and it further comprises a body in which a receiving seat is formed for a centering pin of a platform made in a single piece out of a sheet metal material.

The wedge-shaped groove serves to support the platform and in particular the rotation-blocking element in a plane that is orthogonal to the load direction, in that one side of the rotation-blocking element abuts over an extended contact area a surface that delimits the groove and is oriented parallel to the load direction and the other side abuts an edge formed by a slanted area that delimits the groove.

The dimensions of the holder can be adapted to those of the platform and in particular of the stem. The body of the holder in one embodiment can have a smaller outside cross-sectional profile than the first coupling portion.

The holder can further have a second coupling portion at its end which serves to connect the holder to a force-measuring system that is arranged in the balance or to a transfer device. Preferred is a releasable connection of the holder to the force-measuring system or to the transfer device, so that the holder, too, can be cleaned independently of the platform or the balance. The design of the second coupling portion should be adapted in particular to the connector portion of the force-measuring system or of the transfer device.

The body of the holder and the first coupling portion can have a hollow space serving to receive a guide element of the platform. The diameter of this hollow space matches essentially the dimension of the guide element perpendicular to the load direction.

The hollow space extends at least through the interior of the first coupling portion and a part of the holder. In the load direction it tapers down to a receiving seat for the centering pin of the platform, wherein this receiving seat is arranged at a distance from the first coupling portion and is configured so that the receiving seat can cooperate with the centering pin essentially free of loose play, wherein the platform is plugged into the holder.

The dimension of the hollow space parallel to the load direction matches at least the dimension of the stem of the platform parallel to the load direction, leaving open the possibility that the dimension extends inside the entire holder, so that the latter resembles a sleeve with several different internal cross-section profiles. The sleeve-like configuration is advantageous primarily in regard to achieving the smallest possible weight for the holder.

The wedge-shaped groove which can cooperate with the rotation-blocking element can extend over the diameter of the first coupling portion, whereby the latter is divided at its end into two sections. The groove thus has two parts which are separated by the hollow space in the first coupling portion.

The two sections of the first coupling portion are preferably configured asymmetrically, whereby a preferred orientation is defined for the coupling with the platform. This configuration of the holder has particular advantages for platforms with a load-receiving area that has one or more cantilevered extremities or with a load-receiving area with a distributed load contact surface with an off-centered stem.

Due to the asymmetric configuration of the end portions, the centering pin can enter into engagement with the receiving seat and the rotation-blocking element can enter into engagement with the groove if the platform was set in place correctly. If the platform is set in the holder with incorrect rotary orientation, the transition element is brought into contact with an opposing surface area of the one end portion before the rotation-blocking element or the centering pin can enter into engagement. Thus, the platform hangs in the air—figuratively speaking—and wobbles. A stable connection between the platform and the holder can only be achieved if the platform is inserted correctly.

A further aspect of the invention concerns a method of manufacturing a platform of single-piece construction according to the invention with a load-receiving area for a weighing object and a stem which is arranged parallel to the direction of the load and includes a centering pin, a rotation-blocking element and/or a guide element. The manufacturing process includes as a first step the production of a flat blank out of a sheet metal material, from which a three-dimensional platform is shaped subsequently through suitable bending operations.

This type of manufacturing process is much more advantageous than the fabrication of state-of-the-art weighing pans assembled of plural components, and it even allows the platforms to be mass-produced. Depending on the material being used, it may be necessary to perform further finishing steps such as for example coating, grinding or polishing.

The blank is produced preferably by laser-cutting, die-punching, or waterjet-cutting, whereby individual platforms as well as series of platforms can be produced.

As a particularly advantageous application, a weighing platform, a transfer platform, a first holder and a second holder are used for the platforms in a weighing lift for an electronic balance. Each platform comprises a load-receiving area, a rotation-blocking element and a centering pin, with the load receiving areas being designed preferably in such a way that the respective load-receiving areas of the weighing platform and of the transfer platform can pass through each other without touching each other. Furthermore, each of the holders comprises a first coupling portion at its end, in which a wedge-shaped groove is formed for the positioning of the platform parallel to the load direction, and each holder comprises a body in which a receiving seat is formed for a centering pin of a platform of single-piece construction. By way of the first holder, the weighing platform can be brought into force-transmitting contact with a force-measuring system that is arranged in the balance, and the transfer platform can be connected by way of the second holder to a transfer device for a weighing object.

BRIEF DESCRIPTION OF THE DRAWINGS

The platform according to the invention, the holder which can be used in combination with the platform, and the use of a weighing platform, a transfer platform and two holders in a balance that is capable of automation are described in more detail through the following drawing figures, wherein identical elements have the same reference symbols, and wherein

FIGS. 5a through 5d are partial views of a platform seated in the FIG. 4 holder with FIG. 5a showing a sectional view along the plane AB of FIG. 4a; FIG. 5b showing the platform seated in the FIG. 4 holder in a sectional view along the plane AC.

DETAILED DESCRIPTION OF THE DRAWINGS

Figure 1:
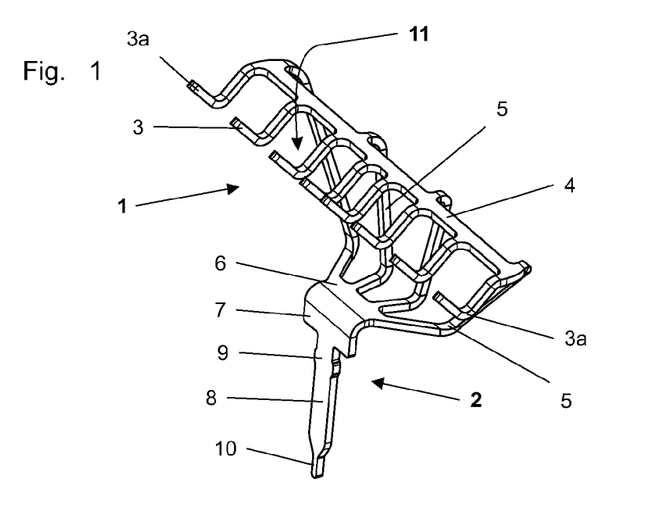
FIG. 1 is a three-dimensional view of a platform according to the invention.

FIG. 1 shows a platform of single-piece construction made from a sheet metal material with a load-receiving area 1 for a weighing object, which continues into a stem 2.

The load-receiving area 1 has at its free end tine-shaped cantilevered extremities 3, 3a which are spaced apart from each other and are distributed over the entire width of the load-receiving area 1, extending perpendicular to the direction of the load. These extremities 3, 3a are bent so that together they form a trough 11 in which a weighing object can be placed. Depending on the length of the weighing object, the latter will rest on two or more of the extremities 3, 3a. The extremities 3, 3a continue into a common uninterrupted connecting element 4 whose width essentially equals the entire width of the load-receiving area 1. This connecting element 4 serves primarily to strengthen the mechanical stability of the extremities 3, 3a. The extremities 3, 3a can be arranged at equal intervals or also, as shown here, with unequal distances from each other.

In order to minimize the weight of the platform, the connecting element 4 to which the extremities 3, 3a are attached is joined to the stem 2 by several supporting members 5 which in this case extend fan-like between the stem 2 and the connecting element 4. The number and the dimension of the supporting members 5 can be adapted to the objects that are to be weighed and/or to the load capacity and resolution of the balance as long as the mechanical and structural integrity of the platform remain assured.

The supporting members 5 meet in a transition element 6 which is oriented perpendicular to the axis A-A in this example.

The transition element 6 continues directly into the stem 2 which includes a rotation-blocking element 7, a guide element 9 and a centering pin 10 which are connected to each other by a stem-like extension 8.

The rotation-blocking element 7 has in this case the same width as the transition element 6. The rotation-blocking element 7 is a flat element of substantially rectangular shape which can cooperate with a groove that is formed in the holder.

From the rotation-blocking element 7 the stem-like extension 8 extends centered and parallel to the direction of the load. In its top third relative to the drawing, the stem-like extension 8 carries the guide element 9 in the form of two projections or wings which extend perpendicular to the axis A-A and serve to support the platform in this direction.

The free end of the stem 2 is configured as a narrow centering pin 10. The centering pin 10 has essentially the shape of a four-corner profile whose dimension is given by the thickness of the sheet metal material used for manufacturing the platform.

Figure 2:
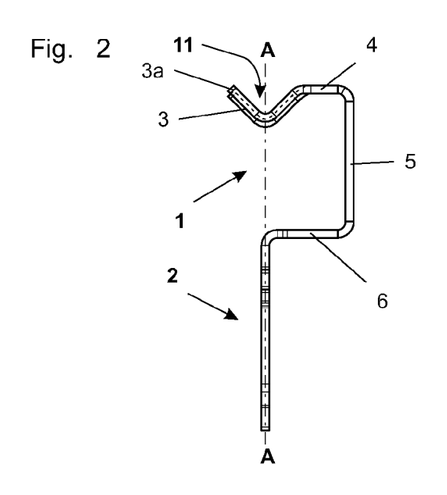
FIG. 2 is a side view of the FIG. 1 platform.

FIG. 2 shows a side view of the platform of FIG. 1, wherein especially the trough 11 can be clearly seen, which is produced by bending the extremities 3, 3a. To prevent the weighing object from falling off the load-receiving area 1, for example in multiple weighings, it suggests itself to bend the extremities 3, 3a unequally, so that for example the extremities 3a at both ends are offset against the direction of the load and thereby delimit the trough 11 that is formed by the extremities 3 which lie in between (see FIG. 1). The trough 11 and the stem 2 are in this case oriented along the axis A-A.

Figure 3:
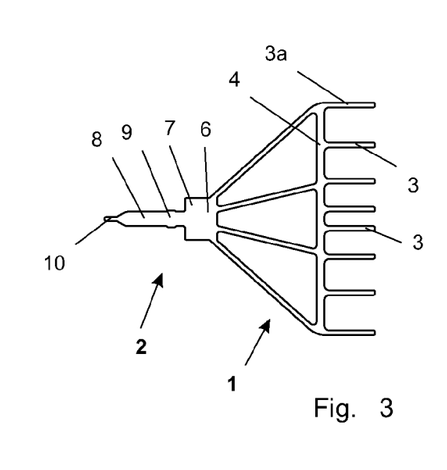
FIG. 3 is a two-dimensional view of a platform or a blank.

FIG. 3 shows a platform or a blank for the platform of FIG. 1 in a two-dimensional view. The blank can be worked out of a flat sheet metal material, for example by laser-cutting, die-punching or waterjet-cutting, and subsequently brought into the three-dimensional shape shown in FIG. 2 by bending. The blank already has all the features of the platform, wherein the transition element 6 and the rotation-blocking element 7 form a structural unit which is only transformed into two functional elements through the bending of the blank, whereby the rotation-blocking element 7 is arranged along the axis A-A (see FIG. 2) and the transition element 6 is arranged perpendicular to the axis A-A.

As an alternative, the blank shown in FIG. 3 could also be used directly as a platform, in which case the weighing object would be set on or attached to the extremities 3.

In particular due to the design of the stem 2, the platform illustrated in FIGS. 1 to 3 can be plugged into or removed from a holder quickly and in particular without causing it to jam through misalignment.

Figure 4A:
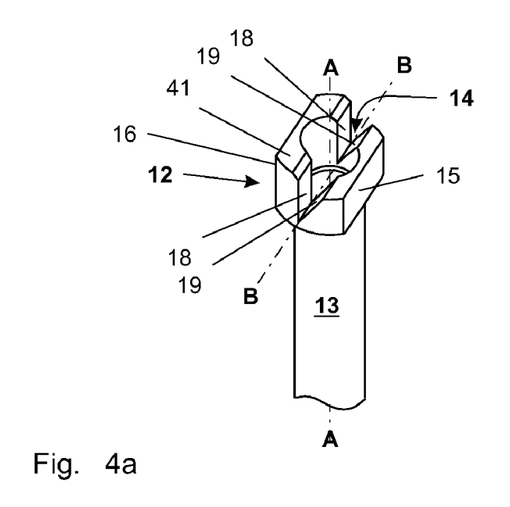
FIG. 4a is a three-dimensional partial view of a holder for a platform.
Figure 4B:
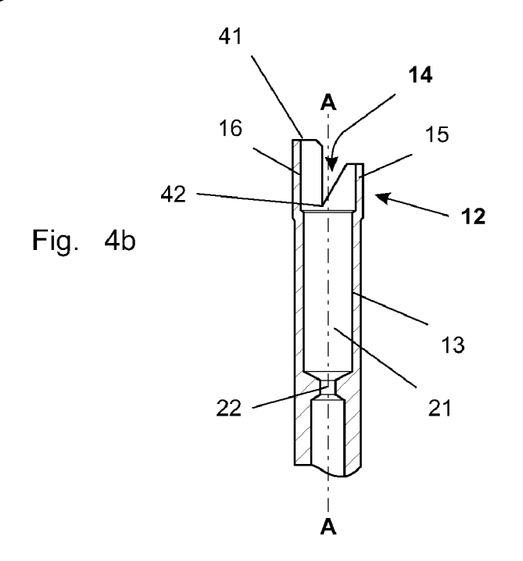
FIG. 4b is a sectional partial view of the holder.
Figure 4C:
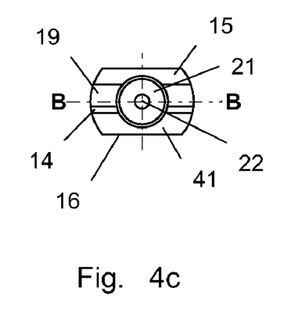
FIG. 4c is a plan view of the holder.
Figure 5A:
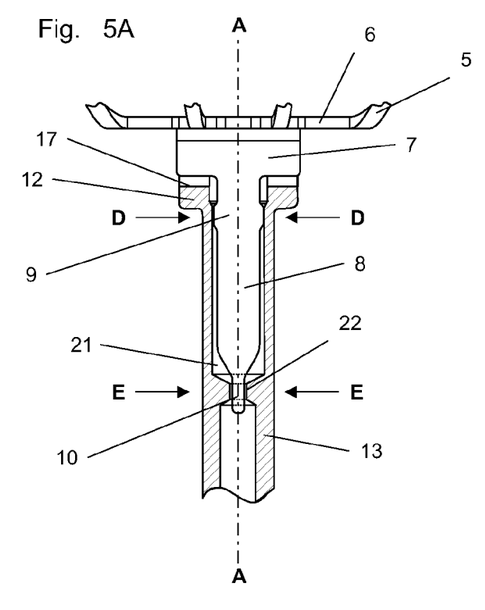
Figure 5B:
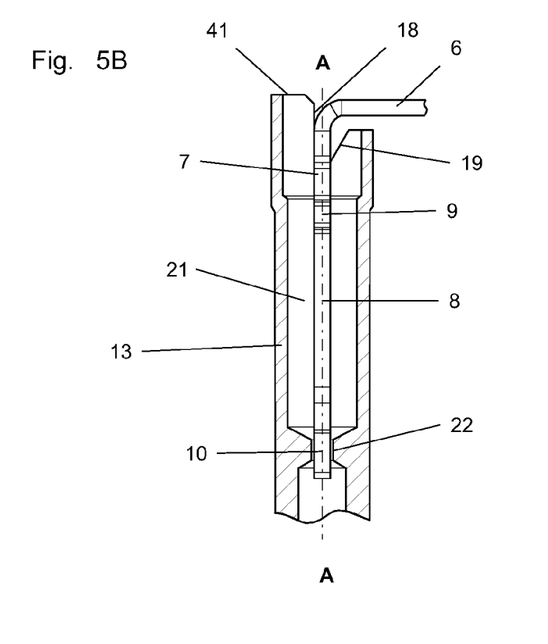
Figure 5C:
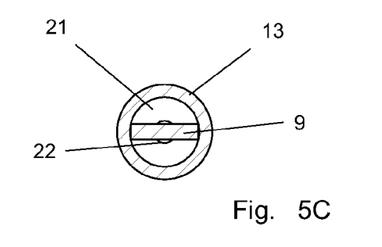
FIG. 5c representing the same view along line D-D, and FIG. 5d showing the view along line E-E.
Figure 5D:
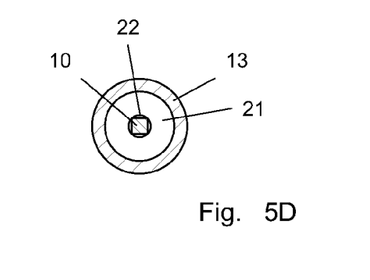

A suitable holder for the platform will now be described in more detail through FIGS. 4a to 4c. Each of the figures shows a partial view of the holder, wherein the part is illustrated which cooperates with the platform, in particular with the stem. The opposite, second end of the holder which is not described here can be connected for example to a force-measuring system that is arranged in a balance or to a transfer device (also see FIG. 11). In the following, FIGS. 4a to 4c are described essentially together.

The holder has a first coupling portion 12 arranged at the end and an elongated sleeve-shaped body 13. The first coupling portion 12 has a wedge-shaped groove 14 which extends perpendicular to the load direction, i.e. to the axis A-A, over the entire diameter of the first coupling portion 12. The wedge-shaped groove 14 divides the first coupling portion 12 into a first end portion 15 and a second end portion 16, with a groove bottom 42 having a parallel offset from the axis A-A by about half of the sheet metal thickness of the stem 2, so that the central axis of the stem 2 can be aligned perpendicular to the axis A-A of the holder or, when the platform is used as a weighing platform, that the stem 2 can be aligned parallel to the load direction.

The end portion 16 is delimited against the groove 14 by two border surfaces 18 that are parallel to the plane AB and has at its free end a contact surface 41 which is arranged perpendicular to the load direction. The end portion 15 is delimited against the groove 14 by two border surfaces 19 which are oriented at an oblique angle to the plane AB, whereby the wedge-shaped groove 14 is formed.

Furthermore, the dimension of the second end portion 16 along the axis A-A is larger in comparison to the first end portion 15. The asymmetrical end portions 15, 16 together with the groove 14 and the contact surface 41 define a direction for the correct seating of the platform relative to the plane that is defined between the axes B and C.

The holder has on the inside along the axis A-A a hollow space 21 which serves to receive the stem of the platform, as shown in FIG. 5. The diameter of the hollow space 21 essentially equals the width of the guide element 9 of the platform. However, the hollow space 21 has a slightly enlarged diameter in the area of the first coupling portion 12 and is narrowed down at the bottom (relative to the drawing) into a receiving seat 22 for the centering pin 10. The diameter and circumference of the receiving seat 22 are matched to those of the centering pin 10 so that when the platform and holder are joined together, the centering pin 10 enters into an essentially play-free engagement with the receiving seat 22.

The unequal diameters of the hollow space 21 and the receiving seat 22 are shown in a top view in FIG. 4c. This illustration further shows that the hollow space 21 and the receiving seat 22 are centered relative to the middle of the holder and that the groove 14 has a slight parallel offset from the plane AB.

FIGS. 5A to 5D show partial views of a platform seated in a holder in a sectional view along the axes A-A and B-B as well as sectional views of the holder along the axes D-D and E-E. When the platform is seated in the holder, the centering pin 10 is constrained essentially without loose play in the receiving seat 22, and the tilting constraint or guide element 9 is constrained essentially without loose play in the hollow space 21.

Because of the asymmetric configuration of the end portions 15, 16 the centering pin 10 can engage the receiving seat 22, and the rotation-blocking element 7 can only engage the groove 14 if the platform has been set correctly into the holder. If the platform is inserted with a wrong orientation, the transition element 6 comes into contact with the contact surface 41 of the second end portion 16 before the rotation-blocking element 7 or the centering pin 10 can seat themselves in their respective engagements. Thus, the platform hangs in the air—figuratively speaking—and wobbles. A stable connection between the platform and the holder can only be achieved if the platform is inserted correctly.

The rotation-blocking element 7 is arranged in the groove 14. In the installed condition, the platform and in particular the rotation-blocking element 7 are constrained in the direction perpendicular to the groove 14 or perpendicular to the plane AB on the one hand by the border surfaces 18 and on the other hand by the oblique border surfaces 19. The rotation-blocking element 7 meets the border surfaces 18 over a contact area and in addition bears against an edge of the border surfaces 19. As a result, the tilting of the platform perpendicular to the plane AB can be prevented and the platform can be aligned parallel to the direction of the load.

The stem-like extension 8 of the platform is arranged completely inside the hollow space 21, the guide element 9 is in contact with the inside wall of the hollow space 21 and is constrained essentially free of play in the hollow space 21. In the installed condition of the platform, the guide element 9 is arranged slightly below (relative to the drawing) the first coupling portion 12.

Based on manufacturing tolerances, it is not possible to permanently ensure that the lower edge of the rotation-blocking element 7 rests on both sides in the groove 14 and in particular on the contact surfaces 17 of the groove 14. The guide element 9 therefore allows the platform to be aligned parallel to the load direction with a straight and snug fit in the holder, which would not be would not be provided by the rotation-blocking element 7 and the groove 14 alone.

A platform according to the invention can have different kinds of load-receiving areas which are connected to a stem of essentially uniform configuration. Different configurations of a platform according to the invention are shown as examples in FIGS. 6 to 10, but of course further platforms that can be coupled by way of a stem to a holder according to the invention can be produced for special applications, balances or weighing objects. The stem is essentially the same for all platforms and the reader is therefore referred to the description of FIGS. 1 to 5 for more details.

Figure 6A:
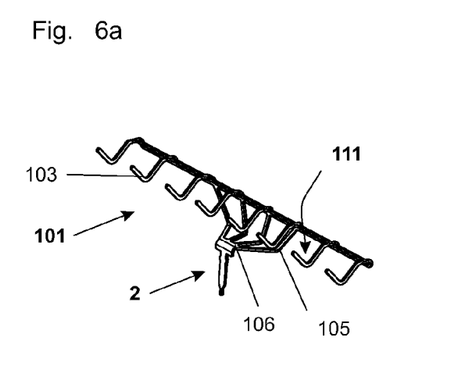
FIG. 6a is a three-dimensional view of a platform with a further load-receiving area.
Figure 6B:
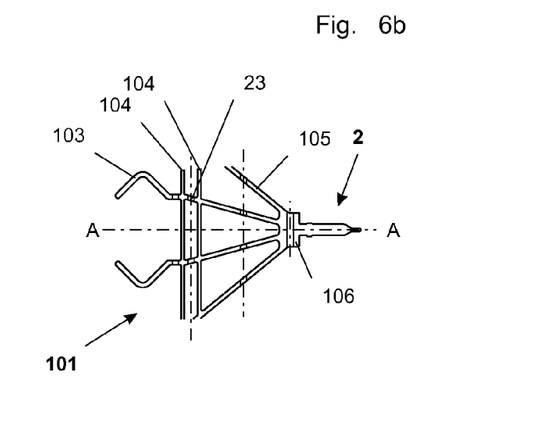
FIG. 6b is a two-dimensional partial view of the blank of the FIG. 6a platform.

FIGS. 6a and 6b show, respectively, a three-dimensional representation of a platform that is made in one piece from a sheet metal material, and a partial view of the platform blank in a plan view. The platform illustrated here has a stem 2 which is connected to a load-receiving area 101. The load-receiving area 101 includes a transition element 106 which is arranged perpendicular to the stem 2 and is connected by a fan-like arrangement of several supporting members 105 to two connecting elements 104 which are arranged parallel to each other and perpendicular to the load direction. Replacing the one connecting element 4 (see FIG. 1) with two narrower connecting elements 104 which are arranged parallel to each other and connected through transverse members serves primarily to reduce the overall weight of the platform. A design of this kind suggests itself in particular for larger platforms.

The load-receiving area 101 further includes a plurality of tine-like extremities 103 which have been bent and turned in such a way that together they form a trough 111 serving to receive a weighing object. As can be seen by examining the blank in FIG. 6b, the extremities 103 are not only bent in the manufacturing process of the platform but are also twisted at the end where they are connected to the connecting element 104. This procedure is based primarily on considerations related to manufacturing technology.

Figure 7A:
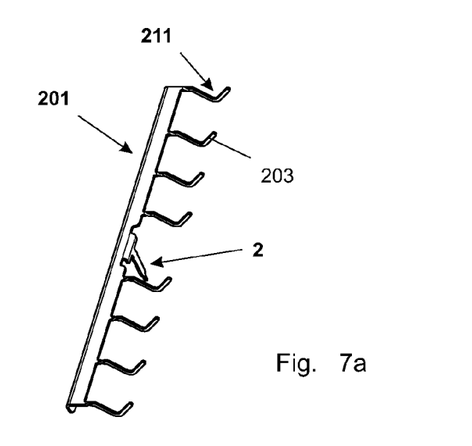
FIG. 7a is a three-dimensional view of a platform with a further load-receiving area.
Figure 7B:
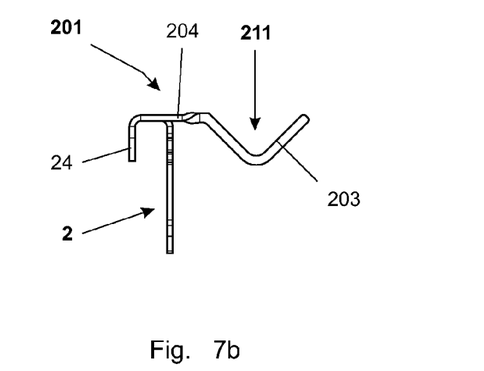
FIG. 7b is a side view of the FIG. 6a platform.

The platform illustrated in three dimensions and in side view in FIGS. 7a and 7b has a slightly different configuration of a load-receiving area 201. In addition, the stem 2 is arranged in the blank (not shown here) centered between the extremities 203 and is subsequently, as can be seen in the drawing, bent downward, i.e. parallel to the load direction, while the extremities 203 are bent and twisted as explained already in the context of FIGS. 6a and 6b, so that they form a trough 211 together. The extremities 203 and the stem 2 are connected directly to a single connecting element 204 whose rigidity is enhanced by a stiffening portion 24 on the opposite side from the extremities 203, essentially in the form of a bent-down flange of the connecting element 204, with the purpose of improving the rigidity and weight distribution of the platform.

Figure 8:
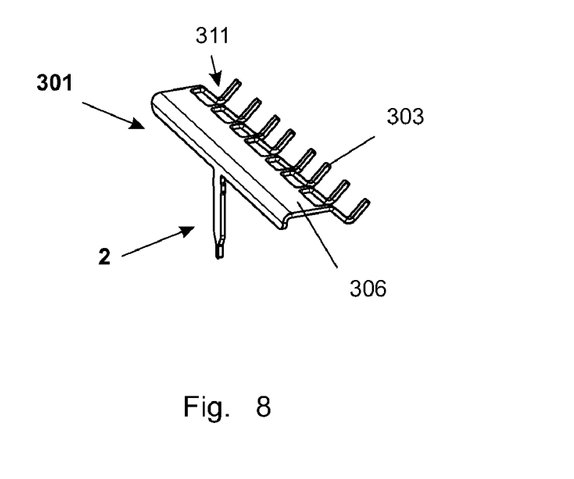
FIG. 8 is a three-dimensional view of a platform with a further load-receiving area.

FIG. 8 shows a three-dimensional illustration of a further platform in which the stem 2 and several extremities 303 are connected directly to a connecting element 306.

Figure 9:
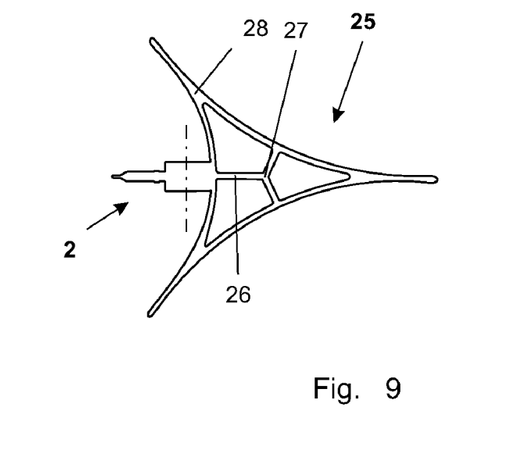
FIG. 9 is a plan view of a blank of a platform for flat or disk-shaped weighing objects.

FIG. 9 represents a plan view of a blank for a platform for disk-shaped weighing objects. The stem 2 is connected to a load-receiving area 25. This platform is connected to a holder in such a way that the mass center of gravity 27 of the load-receiving area 25 is off-centered from the load-receiver of the force-measuring system. The mass center of gravity is located approximately at the intersection of the three inner support members 26 which are delimited on the outside by three outer support members 28 which form essentially a triangle with inward-curved sides.

Figure 10:
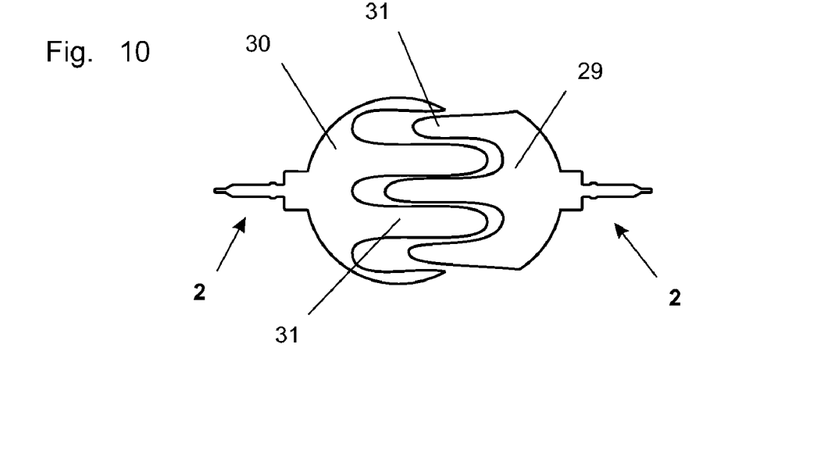
FIG. 10 is a plan view of two blanks passing through each other.

FIG. 10 illustrates the blanks for platforms designed to pass through each other. Each platform has a stem 2 and a load-receiving area 29, 30. The load-receiving areas 29, 30 are shaped essentially like circular segments with finger-shaped extremities 31 which are arranged so that the two platforms can move through each other without coming into mutual contact. As a finishing step in the manufacture of the platforms, only the stem 2 of the blanks is bent at a right angle to the load-receiving area 29, 30. When the platform is installed in a holder, the load-receiving area is brought into alignment with a plane that is perpendicular to the load direction. Platforms of this kind can be used as weighing platforms and transfer platforms in a weighing lift, e.g. for a mass comparator.

Figure 11:
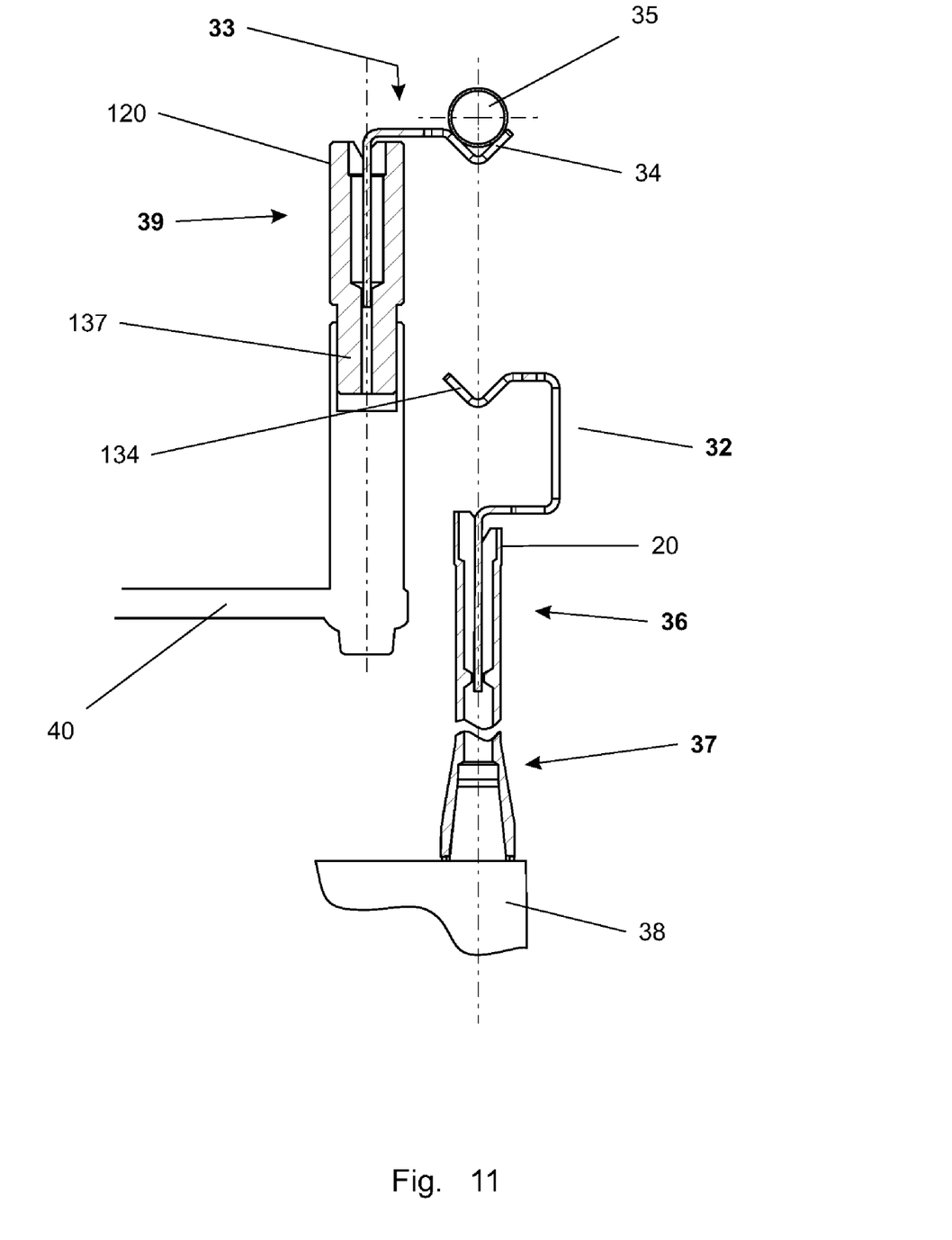
FIG. 11 is a sectional view from the side of a weighing lift for a balance that is capable of automation with a weighing platform and a transfer platform.

FIG. 11 illustrates an application where two platforms and two holders according to the invention are used, respectively as a weighing platform 32 and as a transfer platform 33 in a weighing lift. The two platforms 32, 33 have load-receiving areas 34, 134 designed to pass through each other, which can be moved relative to each other along the axis A-A so that a weighing object 35 as shown here on the transfer platform 33, can be transferred to the weighing platform and removed from it again after a weighing has been performed, with the load-receiving areas 34, 134 moving through each other in the process without touching each other.

The weighing platform 32 is inserted through a first coupling portion 20 into a holder 36 which, in turn, is connected through a second coupling portion 37 at its other end to a force-measuring system 38, for example a weighing cell. Connections of this kind between a force-measuring system are known from the prior art and are therefore not described here in further detail. The holder 36 can be of a single-piece design or also assembled from a plurality of parts.

The transfer platform 33 is inserted by way of a first coupling portion 120 into a holder 39, which through its second coupling portion 137 is connected essentially without loose play to the transfer device 40, wherein the connection can be designed as a fixed or as a releasable connection. The holders 33, 36 can be of a single-piece design or also assembled from a plurality of parts.

A weighing lift according to this design concept has the advantage that after a weighing or at time intervals determined by the user the platforms 32, 33 can be removed, cleaned and reinstalled in a simple manner. For the platforms 32, 33, one can use for example the platforms described in the context of FIGS. 1 to 3, 6 to 8, and 10. For a simple cleaning and quick drying, the cooperation between the stem and the holder as well as the single-piece configuration of the platforms are of primary importance.

The load-receiving areas of the platforms described herein represent only a part of all possible load-receiving areas. As is self-evident, a platform according to the invention can also have other load-receiving areas.

What is claimed is:

1. A platform, for an electronic balance on which an object is to be weighed, comprising:
   a load-receiving area for the object;
   a centering pin; and
   a rotation-blocking element, arranged between the load-receiving area and the centering pin;
   wherein the platform is made in one piece out of a sheet metal material and can be plugged into a holder substantially without loose play.

2. The platform of claim 1, further comprising:
   a guide element arranged between the rotation-blocking element and the centering pin.

3. The platform of claim 2, wherein:
   the rotation-blocking element is larger than either the centering pin or the guide element in a dimension perpendicular to a load direction.

4. The platform of claim 3, wherein:
   the load-receiving area comprises at least two extremities that support the object at a plurality of points.

5. The platform of claim 3, wherein:
the load-receiving area is configured to support the object over a contact surface area.

6. The platform of claim 1, wherein:
the sheet metal material is selected from the group consisting of: a stainless steel, a noble metal, titanium, aluminum, and combinations thereof.

7. The platform of claim 1, wherein:
the load-receiving area comprises at least two extremities that support the object at a plurality of points.

8. The platform of claim 1, wherein:
the load-receiving area is configured to support the object over a contact surface area.

9. A holder for a platform of a balance for weighing an object, the platform having a stem with a centering pin, a guide element and a rotation blocking element, the holder comprising:
a body, having a hollow space defining an axis for receiving the stem;
a first coupling portion arranged at one end of the body;
a wedge-shaped groove formed in the first coupling portion for the positioning the rotation blocking element perpendicular to the axis of the hollow space; and
a seat that axially receives the centering pin, formed along the hollow space in the body,
wherein the wedge-shaped groove and the receiving seat retain the stem in the axial direction substantially without loose play.

10. The holder of claim 9, further comprising:
a second coupling portion arranged at the other end of the body for connecting the holder to a force-measuring system of the balance or to a transfer device.

11. The holder of claim 10, wherein:
a diameter of the hollow space and a dimension of the guide element that is perpendicular to a load direction are substantially equal.

12. The holder of the claim 11, wherein:
the wedge-shaped groove extends over a diameter of the first coupling portion and divides the first coupling portion at its end into two end portions,
wherein a rotation-blocking element of the platform can be brought into engagement with the groove.

13. The holder of claim 12, wherein:
the two end portions of the first coupling portion are asymmetrically configured, thereby defining a preferred direction for inserting the platform therein.

14. The holder of claim 9, wherein:
a diameter of the hollow space and a dimension of the guide element that is perpendicular to a load direction are substantially equal.

15. The holder of the claim 9, wherein:
the wedge-shaped groove extends over a diameter of the first coupling portion and divides the first coupling portion at its end into two end portions,
wherein a rotation-blocking element of the platform can be brought into engagement with the groove.

16. The holder of claim 15, wherein:
the two end portions of the first coupling portion are asymmetrically configured, thereby defining a preferred direction for inserting the platform therein.

17. A method for manufacturing a single-piece platform for an electronic balance on which an object is to be weighed, comprising the steps of:
producing a flat blank from a sheet metal material; and
shaping the flat blank in subsequent bending steps to form the platform in three dimensions, the platform having a load-receiving area for the object, as well as a stem arranged parallel to the direction of the load, the stem comprising a centering pin, a rotation-blocking element and/or a guide element.

18. The method of claim 17, wherein:
the blank-producing step is accomplished by at least one of: laser-cutting, die-punching, and waterjet-cutting.

19. A method for using an electronic balance that comprises a weighing platform and a transfer platform, and first and second holders for the platforms in a weighing lift, wherein each of the platforms comprises a load-receiving area, a rotation-blocking element and a centering pin, each of the holders comprises a first coupling portion at an end thereof, with a wedge-shaped groove formed in the first coupling portion for positioning the platform relative to the direction of the load imposed by an object being weighed, and each of the holders is a single-piece construction that also comprises a body with a receiving seat formed for the centering pin of the platform, the method comprising the steps of:
placing the weighing platform into force-transmitting contact with a force-measuring system arranged in the balance, by way of the first holder;
connecting the transfer platform to a transfer device for the object, by way of the second holder; and
configuring the respective load-receiving areas so that they can pass through each other.

* * * * *

UNITED STATES PATENT AND TRADEMARK OFFICE
CERTIFICATE OF CORRECTION

| | |
|---|---|
| PATENT NO. | : 7,759,586 B2 |
| APPLICATION NO. | : 12/047373 |
| DATED | : July 20, 2010 |
| INVENTOR(S) | : Zeiss et al. |

It is certified that error appears in the above-identified patent and that said Letters Patent is hereby corrected as shown below:

In column 11, line 22, please delete "for the positioning the rotation" and insert -- for positioning the rotation --

Signed and Sealed this

Thirty-first Day of August, 2010

David J. Kappos
*Director of the United States Patent and Trademark Office*